US011531593B2

(12) United States Patent
Hao et al.

(10) Patent No.: US 11,531,593 B2
(45) Date of Patent: Dec. 20, 2022

(54) DATA ENCODING, DECODING AND RECOVERING METHOD FOR A DISTRIBUTED STORAGE SYSTEM

(71) Applicant: HERE DATA TECHNOLOGY, Guangdong (CN)

(72) Inventors: Bin Hao, Guangdong (CN); Jian Zhu, Guangdong (CN); Jingyao Zhang, Guangdong (CN)

(73) Assignee: HERE DATA TECHNOLOGY, Shenzhen (CN)

( * ) Notice: Subject to any disclaimer, the term of this patent is extended or adjusted under 35 U.S.C. 154(b) by 88 days.

(21) Appl. No.: 16/973,027

(22) PCT Filed: Sep. 3, 2018

(86) PCT No.: PCT/CN2018/103805
§ 371 (c)(1),
(2) Date: Dec. 7, 2020

(87) PCT Pub. No.: WO2020/047707
PCT Pub. Date: Mar. 12, 2020

(65) Prior Publication Data
US 2021/0271557 A1    Sep. 2, 2021

(51) Int. Cl.
G06F 16/27 (2019.01)
G06F 11/14 (2006.01)

(52) U.S. Cl.
CPC ...... *G06F 11/1448* (2013.01); *G06F 2201/80* (2013.01)

(58) Field of Classification Search
CPC .......... G06F 11/1448; G06F 2201/80; G06F 11/1464; G06F 11/1469; G06F 11/2028; G06F 16/27; G06F 16/1827
See application file for complete search history.

(56) References Cited

U.S. PATENT DOCUMENTS 10,503,611 B1* 12/2019 Srivastav ............ G06F 11/1076
2018/0373600 A1* 12/2018 Xu ...................... G06F 11/1464

\* cited by examiner

*Primary Examiner* — Etienne P Leroux
*Assistant Examiner* — Cindy Nguyen

(57) ABSTRACT

Disclosed is a data encoding, decoding and recovering method of a distributed storage system for data protection of the distributed storage system. The methods include using local recoverable coding, and calling Reed-Solomon coding on data blocks obtained from divisions of file segments based on coding parameters to generate global coding blocks, locally coding to data blocks and global coding blocks respectively to generate local coding blocks. The methods can also include computing decoded block indices and recovered block indices according to current node state, reading block data of assistant node, and implementing decoding of file segments and recovery of failed blocks. The coding method of the present disclosure can reduce the amount of data that needs to be transmitted when recovering a failed node by increasing local coding blocks and speed up the node recovery speed.

12 Claims, 2 Drawing Sheets

DATA ENCODING, DECODING AND RECOVERING METHOD FOR A DISTRIBUTED STORAGE SYSTEM

TECHNICAL FIELD

The present disclosure relates to the field of network coding, in particular to data encoding, decoding and recovering method in a distributed storage system.

BACKGROUND

Distributed storage systems such as HDFS, Windows Azure and GFS employ data redundant policy including multiple repetitions and erasure codes to achieve high reliability and high availability. The strategy of multiple repetitions has high read efficiency, but its main disadvantage is high storage redundancy, for example the storage redundancy is up to 200% in case of 3-repetitions. High storage redundancy brings high storage costs and becomes unavailable in large-scale storage clusters. Compared with multiple repetitions, Reed-Solomon (RS) erasure code encodes original data to generate encoded data (the total amount is generally much smaller than that of the original data) as storage redundancy, greatly reducing storage costs. For example, in RS(10,4) code, the original file segment is divided into 10 data blocks and encoded to generate additional four coded blocks, resulting in only 40% storage redundant. However, because RS erasure coding requires encoding when writing data and reading from more nodes when reading data, the access efficiency of RS erasure coding is lower than that of multiple repetitions; accordingly, the policy of RS erasure coding is not applicable to frequently access data storage, and is suitable to store warm data with large storage scale and low access frequency or cold data storage. On the other hand, RS coding is Maximum Distance Separable (MDS) coding, which has the highest storage efficiency with the same reliability. For example, the storage redundancy is 40% in case of RS (10, 4), supporting four failed storage node at most, while the storage redundancy is 200% in case of 3-repetitions, supporting up to two failed nodes.

RS coding has lower data redundancy than that of the multiple repetitions and its storage space utilization efficiency is relatively higher, so it has higher storage efficiency but requires higher repair bandwidth; for example, if a data block on a storage node fails when using RS (10, 4) coding, ten coded blocks are needed to be read and transmitted from other two online nodes to recover a data block. In a large scale storage cluster, storage node failure is normal, and the system is often in a condition that recovers failed nodes. Accordingly, higher repair bandwidth will reduce the performance of normal access. Though it has a highest repair efficiency in multiple repetitions, only one copy of the same length needs to be read when a data block fails, but there is an obvious disadvantage that it has the highest storage redundancy. In order to overcome the shortcomings of the above RS coding and multiple repetitions, by adding a local coding block, a local repairable/recoverable/regenerate code (LRC) increases a certain additional storage redundancy to achieve a lower repair bandwidth. The local coding block is generated by linear operation of at most r (r<<k) data blocks or RS coded blocks, where r is repair degree or Locality, that is, the number of other data blocks that need to be read to recover a single data block. Since the majority failures in clusters are single-node failures, LRC coding has a much lower repair degree than that of RS coding, which greatly reduces the repair bandwidth and thus improves the normal access efficiency of the system.

Facebook adds an HDFS-Xorbas module into HDFS to achieve LRC. It implements LRC(k=10, m=6, r=5) coding on the basis of RS (k=10, m=4), that is, ten data blocks generate four RS global coding blocks, every r=5 data blocks generate one local coding block, and there are two local coding blocks. LRC (k=10, m=6, r=5) coding is very efficient in repair bandwidth and disk IO (only five data blocks need to be read to recover when a single node fails); but its disadvantage is that under normal circumstances, LRC (k, n−k, r) needs to satisfy a condition that n is an integral multiple of (r+1), the size of a constructable field is $(|F|=q>(n, k+k/r-1)>>n)$, the complexity of constructive time is exponential time $(k^2 8^n)$, and it is still an open problem that how to construct such LRC code in polynomial time and within the field $(|F|=q>n)$.

SUMMARY

The present application provides a data encoding, decoding, and recovering method for a distributed storage system, so that it can reduce recovery time for failed nodes concurrently with the minimum feasible repair bandwidth when RS coding is used in a distributed storage system.

According to a first aspect of the present disclosure, a coding method of a distributed storage system disclosed herein may include:

an initializing step configured for setting coding parameters; and an encoding step configured for: dividing every file segment into k data blocks, calling RS(k, m+1) coding to k original data blocks, generating in global coding blocks; for k data blocks, performing XOR operations on r data blocks which are taken out in sequence from k data blocks to totally generate ⌈k/r⌉ local coding blocks; and for in global coding blocks, performing XOR operations on r coding blocks which are taken out in sequence from in global coding blocks to totally generate ⌈m/r⌉ local coding blocks.

According to a second aspect of the present disclosure, a data decoding method of a distributed storage system disclosed herein may include:

collecting the states of storage nodes, reading the states of n storage nodes stored in every data block and coding block which have been encoded, and acquiring an online-block index list and a failed-block index list;

obtaining a decodable state based on the states of storage nodes;

determining the position of data to be read during decoding according to different decodable states to define a decoding index list;

reading data blocks or coding blocks needed by decoding according to the decoding index list; and decoding file segments based on the decodable state, indices of decoded blocks, and their corresponding block data which have already been read.

According to a third aspect of the present disclosure, a data recovering method of a distributed storage system disclosed herein may include:

collecting the states of storage nodes, reading the states of n storage nodes stored in every data block and coding block which have been encoded, and acquiring an online-block index list and a failed-block index list;

obtaining a recoverable state based on the states of storage nodes;

acquiring a repairing block index list that should be read and is used for recovering failed blocks according to the recoverable state;

reading data blocks or coding blocks of storage nodes corresponding to the indices of repaired blocks according to the repairing block index list; and recovering failed blocks based on the recoverable state, indices of repairing blocks, and their data of corresponding blocks.

According to the coding method and the data decoding and recovering method of the distributed storage system according to the embodiments, a local coding block is added to reduce the amount of data that needs to be transmitted when repairing a failed node and speed up the node repairing speed. This solution can solve the problem of excessive repair bandwidth when the RS code is used in the distributed storage system, and can reduce the recovery time of the failed node, thereby improving the data access speed and throughput of the storage system.

DETAILED DESCRIPTION

Figure 1:
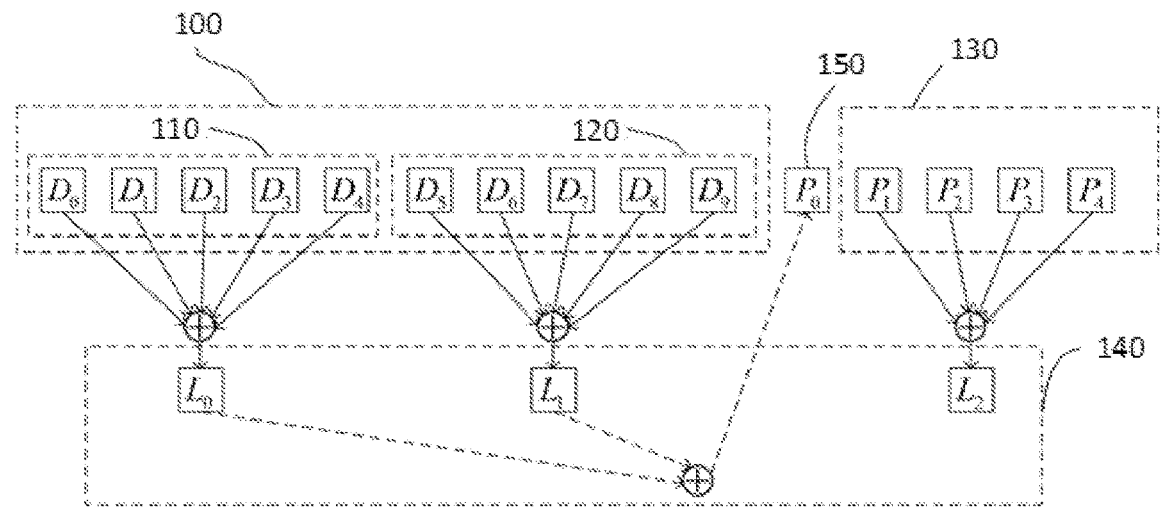
FIG. 1 is a schematic diagram of encoding in a distributed storage system.

The present disclosure will be further described in detail below through specific embodiments in combination with the accompanying drawings. Many details described in the following embodiments are for the purpose of better understanding the present disclosure. However, a person skilled in the art can realize with minimal effort that some of these features can be omitted in different cases or be replaced by other methods. For clarity some operations related to the present disclosure are not shown or illustrated herein so as to prevent the core from being overwhelmed by excessive descriptions. For the person skilled in the art, such operations are not necessary to be explained in detail, and they can fully understand the related operations according to the description in the specification and the general technical knowledge in the field.

In addition, the features, operations or characteristics described in the specification may be combined in any suitable manner to form various embodiments. At the same time, the steps or actions in the described method can also be sequentially changed or adjusted in a manner that can be apparent to those skilled in the art. Therefore, the various sequences in the specification and the drawings are only for the purpose of describing a particular embodiment, and are not intended to be an order of necessity, unless otherwise stated one of the sequences must be followed.

An encoding, data decoding and a recovering method for a distributed storage system provided in embodiments of the present disclosure put forward a locally recoverable encoding method and accordingly data decoding and recovering method based on the encoding method.

In the embodiments of the present disclosure the basic unit of data encoding, decoding and recovery is a file segment which is a fixed-length data segment. When encoding a single file, the file is firstly divided into file segments which are then encoded one by one. If the file length is not an integral multiple of the length of a file segment, one or more zeros are added to the end of the file segment with insufficient length till it matches the size of a standard file segment, and then the supplemented file segment is encoded. The locally recoverable encoding method, data decoding and recovering method are introduced herein with a distributed storage system as an application example in the present embodiments.

Embodiment 1

A locally recoverable encoding method for a distributed storage system primarily includes an initializing step and an encoding step. The initializing step which can be run when the distributed storage system is deployed or an encoding module thereof is started is mainly to configure encoding parameters, for example, setting k as the number of original data blocks obtained after the file segment is divided, m as the number of RS global coding blocks, r as a repair degree (that is, a single node failure can be recovered by data blocks in r nodes, so the size of a local coding packet is r+1), and w as an algebraic operation field GF (i.e. the operation field is $GF_{2^w}$). The total number of coding blocks n can be obtained according to the parameters (k, m, r), and the RS coding parameters are ($k_{rs}$=k, $m_{rs}$=m+1). When encoding is performed in time of writing a file, the file is first divided into file segments, each of which is further separated into k data blocks. The k data blocks generate n data blocks/coding blocks by using the locally recoverable encoding method of the present embodiment. Last, the n data blocks/coding blocks are written to n storage nodes. Specifically, the coding process is as follows.

1. Initializing Step 1.1 Parameters required by coding are inputted: number of data blocks k, number of global coding blocks m, local repair degree (Locality) r, operation field GF setting w=4, 8, 16 or 32; and algebraic operations (scalar multiplication, addition) within the field $GF_{2^w}$ are performed.

1.2 LRC coding parameters are set: setting $k_{rs}$=k as the number of RS data blocks, $m_{rs}$=m+1 as the number of RS coding blocks, that is LRC is implemented based on RS ($k_{rs}$, $m_{rs}$), n=k+m+⌈k/r⌉+⌈m/r⌉ as the total number of data blocks after LRC coding, and $w_{lrc}$=$w_{rs}$=w. As shown in FIG. 1, LRC (k=10, m=4, r=5) is used as a special case in this embodiment to explain part of the process more clearly, that is, in original data blocks 100, $k_{rs}$=k=10, global coding block m=4, $m_{rs}$=5, repair degree r=5, the number of local coding blocks formed by data blocks is ⌈k/r⌉=2, the number of local coding block formed after the global coding block is encoded is ⌈m/r⌉=1, namely, the total number of local coding block is ⌈k/r⌉+⌈m/r⌉=2+1=3. The total number of data segments is n=10+4+3=17.

2. Encoding Step 2.1 RS coding parameters $k_{rs}$, $m_{rs}$, $w_{rs}$ are obtained.

2.2 According to RS coding parameters, the global coding block m, by utilizing RS encoding algorithm is generated, and LRC global coding block which also referred to as global parity (GP) is the coding blocks of RS coding blocks without a first coding block, i.e. the number of LRC GP is $m_{rs}$−1, for example, the global coding blocks $P_1$, $P_2$, $P_3$, $P_4$ shown in FIG. 1. The first coding block in RS coding blocks is an implicit global coding block 150, such as the implicit global coding block 150 $P_0$ shown in FIG. 1, is obtained by XORing all data blocks (which is also equal to the result of the XOR operation of the first $\lceil k/r \rceil$ local coding blocks. It is used in the subsequent auxiliary decoding or recovery, and it is not actually stored in nodes (when needed, it is generated dynamically by the first $\lceil k/r \rceil$ local coding blocks).

2.3 An XOR operation on r data blocks which are read orderly from the first k data blocks is performed to generate $\lceil k/r \rceil$ local coding blocks also referred to as local parity LP, and when the last packet is insufficient with r data blocks, an XOR operation on the actual remaining data blocks is performed. One local coding block, also referred to as one local coding packet, is obtained by adding r data blocks/coding blocks with their XOR operational result; that is, the one local coding packet has r+1 blocks. As shown in FIG. 1, $L_0$ in local coding block 140 is obtained by XOR operation of data blocks $D_0$, $D_1$, $D_2$, $D_3$ and $D_4$, and $L_1$ in local coding block 140 is obtained by XOR operation of data blocks $D_5$, $D_6$, $D_7$, $D_8$ and $D_9$. The data blocks and local coding blocks shown in FIG. 1 together form two local coding packets, namely a first local coding packet 110 and a second local coding packet 120, where the first local coding packet 110 includes $D_0$, $D_1$, $D_2$, $D_3$, $D_4$ and $L_0$, and the second local coding packet 120 include $D_5$, $D_6$, $D_7$, $D_8$, $D_9$ and $L_1$. Note that the number of data blocks can be divisible by r=5 in FIG. 1, while in some embodiments, when k is not divisible by r, the actual remaining data blocks in the last packet is performed an XOR operation; for example, if the number of data blocks in FIG. 1 is k=9 (not including $D_9$), the local coding block $L_1$ is obtained by the XOR operational result of data blocks $D_5$, $D_6$, $D_7$ and $D_8$, and then the second local coding packet includes $D_5$, $D_6$, $D_7$, $D_8$ and $L_1$.

2.4 An XOR operation on r coding blocks which are read orderly from $m = m_{rs}-1$ LRC global coding blocks is performed to generate $\lceil m/r \rceil$ local coding blocks, and also when the last packet is insufficient with r coding blocks, an XOR operation on the actual remaining coding blocks is performed. $P_1$, $P_2$, $P_3$, $P_4$ and $L_2$ in FIG. 1 form a third local coding packet 130, the final total number of coding blocks is $n = k+m+\lceil k/r \rceil+\lceil m/r \rceil$, $\{0, 1, \ldots, k-1\}$ are indices of original data blocks, $\{k, \ldots, k+m-1\}$ are indices of global coding blocks, and $\{k+m, \ldots, n-1\}$ are indices of local coding blocks. Taking LRC (10, 4, 5) as an example, the indices of local coding packets are $\{0,1,2,3,4,14\}$, $\{5,6,7,8,9,15\}$, $\{10,11,12,13,16\}$ distributed to correspond to $\{D_0, D_1, D_2, D_3, D_4, L_0\}$, $\{D_5, D_6, D_7, D_8, D_9, L_1\}$, $\{P_1, P_2, P_3, P_4, L_2\}$ in FIG. 1, where the number of the third local coding packet 130 is insufficient with r=5 and is subject to actuality.

In this embodiment, the method proposed is based on RS coding without requirement of n being an integral multiple of (r+1), and it can be constructed in a polynomial time and within a smaller field, namely $|F|=q>n$ can be met. The selection of coding matrices satisfying the first RS coding block during encoding can be obtained by the XOR operation of the first $\lceil k/r \rceil$ local coding blocks, i.e. the implicit global coding block which does not need to be stored, further improving storage efficiency.

Embodiment 2

A decoding method based on the locally recoverable encoding method for the distributed storage system in Embodiment 1 is provided in the present embodiment. Decoding occurs during file reading, and it can be performed on a client or a current online storage node storing file segments (where a decoding node is commonly referred to as a master node). The file segments are decoded one by one for client access.

Decoding based on the locally recoverable encoding method of the distributed storage system is as follows:

1. The states of storage nodes are collected, the node state stored in each data block and coding block which are acquired after encoding current file segments are read, and an online-block index list and a failed-block index list are achieved, where n storage-node indices are $\{0, 1, \ldots, n-1\}$.

2. A decodable state is obtained based on the states of storage nodes. The data blocks/coding blocks obtained after a file segment is encoded are distributed on different storage nodes to improve system reliability in a distributed storage system. During decoding, it is needed to obtain the decodable state according to the node state of current data blocks/coding blocks (that is the online-block index list and the failed-block index list).

2.1 Decodable State of a Single Failed Node

The majority failures in the distributed storage systems are single-node failures, so the decoding for single-node failures is specially optimized in the present embodiment. When the failed node is a data node, failed blocks can be always obtained by XORing blocks beyond failed nodes in the local coding packet, and a locally decodable state is returned. When the failed node is a global coding block or a local coding block, a decoding-free state is returned.

2.2 When there is not one failed node, the decodable state can be determined by the following estimates.

When storage nodes storing k data blocks are online, the decoding-free state is returned;

When there is only one data block failed in each local coding packet and the local coding block is online, the locally decodable state is returned;

When no less than k blocks from k data blocks and m global coding blocks are online, a RS-only decodable state is returned. Note that such condition can also be processed by local and RS joint decoding; however, when concerning repair bandwidth, the use of local and RS joint decoding may undoubtedly increase the repair bandwidth and the recovery time is also extended in case of using only RS decoding to complete decoding.

When the local coding block can be recovered by local decoding, the implicit global coding block can accordingly be recovered, or the number of data blocks or global coding blocks recovered by local decoding is k, the remaining failed data blocks can be obtained by RS decoding, and a local and RS jointly decodable state is returned.

When the above conditions are not met, an undecodable state is returned, and file segments are undecodable.

3. According to different decodable states, the position of data to be read during decoding is determined to define a decoding index list which is a data segment index list needed to be read by decoding file segments and is also referred to as an assistant decoding node list.

3.1 Decoding-Free State

The indices $\{0, 1, \ldots, k-1\}$ of the first k data blocks are returned, and file segments are jointly recovered by the first k data blocks.

3.2 Locally Decodable State

The indices of r blocks beyond failed data blocks in each local coding packet are added in sequence into the decoding index list in an original coding order (i.e. index is progressively increased). The index sequence beyond the failed nodes within the local coding packet in which the failed nodes located and all other non-failed online local coding packet node indices are added into the decoding index list.

For example, for LRC (10,4,5), if only data block 0 is failed, the local coding packet where 0 is located is {0,1,2,3,4,14}, and the decoding index list to be returned is {1,2,3,4,5,6,7,8,9,14}.

3.3 RS-Only Decodable State

The block indices of the first k online blocks in the first k+m data segments are added into the decoding index list.

3.4 Local and RS Jointly Decodable State

The failed nodes in $\lceil k/r \rceil + \lceil m/r \rceil$ local coding packets are checked in turn, and when they can be repaired, the block indices beyond the failed nodes in the local coding packets are added into the decoding index list until the number of recoverable/online blocks in the first k+m blocks is k, and the decoding index list is returned. During such process, after checking the first $\lceil k/r \rceil$ local coding packets, if the first $\lceil k/r \rceil$ local coding blocks can be recovered, then the number of recoverable/online blocks can be increased by one when the implicit global coding block can be dynamically generated; and when the number reaches k, the decoding index list is returned.

3.5 Undecodable State

When file segments are undecodable, an empty decoding index list is returned.

4. The data blocks or coding blocks required by decoding are read according to the decoding index list. Based on the decoding index list obtained in step 3, a corresponding data block or coding block are read from a corresponding storage (assistant decoding) node.

5. The file segments are decoded according to the decodable state, indices of decoded blocks and their corresponding block data which have already been read.

5.1 Decoding-Free

When the decoding-free state is returned, k online data blocks are jointly to form the original file segments without decoding.

5.2 Locally Decodable

When the locally decodable state is returned, a local packet decoding algorithm is employed, which includes: for every failed data block, obtaining r online local blocks (containing r−1 data blocks and one local coding block), performing an XOR operation on all the local blocks to decode and get the failed data blocks, and combining k (original) data blocks into the original file segments.

5.3 RS-Only Decodable

When the RS-Only Decodable State is Returned, a RS Decoding Algorithm is employed, which includes: using k online data blocks or global coding blocks, and adopting a standard RS decoding algorithm to decode to acquire all k (original) data blocks including the failed data blocks.

5.4 Local and RS Jointly Decoding

When the local and RS jointly decodable state is returned, XOR operation and RS decoding are employed, which include: attempting to recover data blocks by using local decoding, and using RS decoding to collect all original data blocks when there are k recoverable or online blocks in current k+m data segments; or, attempting to recover the first $\lceil k/r \rceil$ local coding blocks, recovering the implicit global coding block when all blocks can be recovered, and using RS decoding to collect all original data blocks when there are k recoverable or online blocks in the first k+m data segments and the implicit global coding block; or, attempting to recover the failed blocks in the implicit global coding block, and using RS decoding to collect all original data blocks when there are k recoverable or online blocks in the first k+m data segments and the implicit global coding block; or, decoding being failed.

Embodiment 3

A data recovering method based on the locally recoverable encoding method for the distributed storage system in Embodiment 1 is provided in the present embodiment. The recovery can be performed on a client, a current online storage node in which file segments are located (which generally a primary node) or a node substituting for the failed node when the recovery occurs on a failed node. The recovery will be explained from the substitute node. It is obvious for those skilled in the art to implement the client or the online storage node.

The data recovering method based on the locally recoverable decoding method for the distributed storage system may be as follows.

1. The storage node states are obtained, the states of n storage nodes stored in each encoded data block and encoded coding block are read, and the online-block index list (i.e. online storage node sequence) and the failed-block index list (i.e. failed storage node sequence) are acquired.

2. The recoverable state is obtained according to the storage node states.

When the failed-block index list is empty, a recovery-free state is returned;

When the failed-block index list contains only one index, a single-failed-block local recovery state is returned; and when each failed block locates in different local coding packets, a multi-failed-block local recovery state is returned;

When there are at least k valid data segments (data blocks or global coding blocks) in current k+m data segments, a RS decodable recovery state is returned; and When the above conditions are not met, failed data blocks are recovered by using local decoding. When there are at least k valid data segments in the first k+m data segments, a local and RS decoding jointly recoverable state is returned; otherwise, the local coding block is recovered, the implicit global coding block is dynamically recovered when all local coding blocks can be recovered, and when there are at least k valid data segments in the first k+m data segments and the implicit global coding block, the local and RS decoding jointly recoverable state is returned; and at last, the failed global coding block can be attempted to be recovered by using local encoding, and when there are at least k valid data segments in the first k+m data segments and the implicit global coding block, the local and RS decoding jointly recoverable state is returned.

3. According to the recoverable state, a repairing block index list which is used for recovering failed blocks and should be read can be obtained.

When the recoverable state is the single-failed-block local recovery one, the local coding packet of the failed node (not including the failed node), i.e. the repairing block index list, can be obtained. In the original data blocks 200 shown in FIG. 2, k=10, only $D_0$ is failed in a first local coding packet 210 $\{D_0, D_1, D_2, D_3, D_4, L_0\}$, no failures in a second coding packet 220 and a third local coding packet 230, and the repairing block index list {1,2,3,4,14} corresponding to the online data segments $\{D_1, D_2, D_3, D_4, L_0\}$ is returned.

When the recoverable state is the multi-failed-block local recovery one, for each failed node, its corresponding local coding packet is obtained and added into the repairing block index list. In the original data blocks 300 shown in FIG. 3, k=10, a first local coding packet 310 and a third local decoding 330 each has a data segment failure ($D_0$, $P_1$), the union {1,2,3,4,10,11,12,13,14,16} formed by the repairing block index list {1,2,3,4,14} corresponding to $\{D_1, D_2, D_3, D_4, L_0\}$ in the first local coding packet 310 (except failed nodes) where $D_0$ locates and the repairing block index list {10,11,12,13,16} corresponding to $\{P_2, P_3, P_4, L_2\}$ in the third local coding packet 330 (except failed nodes) where $P_1$ locates.

When the recoverable state is the RS decodable recovery state, the storage nodes corresponding to the first k online data segments are added into the repairing block index list. In the original data blocks 400 shown in FIG. 4, k=10, a first local coding packet 410 has two data block failures $\{D_0, D_3\}$ which cannot be repaired by local decoding, and an index list {1,2,4,5,6,7,8,9,10,11} corresponding to the first ten online data segments $\{D_1, D_2, D_4, D_5, D_6, D_7, D_8, D_9, P_1, P_2\}$ from the first local coding packet 410, a second local coding packet 420 and a third local coding packet 430 is adopted.

Figure 5:
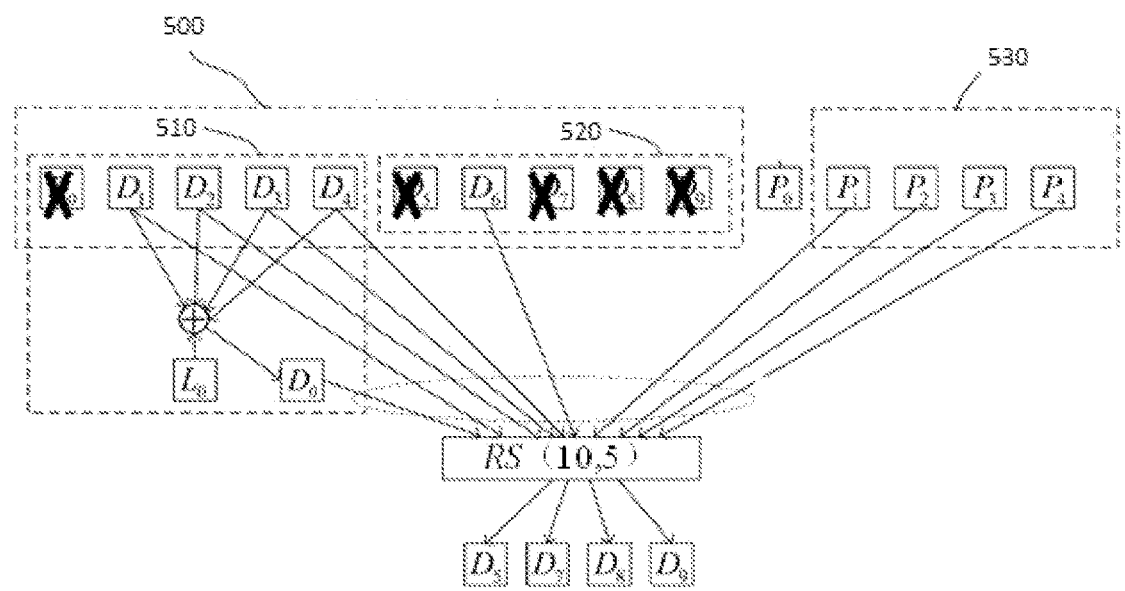
FIG. 5 is a schematic diagram of joint recovery of local and RS decoding for multiple failed nodes.

When the recoverable state is the local and RS decoding jointly recoverable state, failed nodes in the first $\lceil k/r \rceil$ local coding packets are checked, and when the failed nodes can be recovered, block indices beyond failed nodes in the coding packets are added into the repairing block index list. When the implicit global coding block is recoverable, its corresponding local coding packet is added into the repairing block index list. The failed nodes in the latter $\lceil m/r \rceil$ local coding packets are checked and when the failed nodes are recoverable, block indices beyond failed nodes in the coding packets are added into the repairing block index list. In the above process, when the number of recoverable blocks in current k+m blocks and the implicit global coding block reaches k, the repairing block index list is returned. An example of local and RS decoding jointly recovery is shown in FIG. 5, in the original data blocks 500, k=10, only $D_0$ is failed in a first local coding packet 510. The failed one can first be recovered by local decoding, the repairing block index list {1,2,3,4,14} corresponding to the local coding packet $\{D_1, D_2, D_3, D_4, L_0\}$ where it locates is added to the repairing block index list. At this point, there are ten online segments ($L_0$ can be regarded as $D_0$) in the first fourteen data segments which are from the first local coding packet 510, the second local coding packet 520 and the third local coding packet 530, namely, $\{D_1, D_2, D_3, D_4, L_0\} \cup \{D_6, P_1, P_2, P_3, P_4\}$, the ten segments can be repaired by RS, and its corresponding index list {1,2,3,4,6,10,11,12,13,14} is returned.

When the recoverable state is unrecoverable, an empty repairing block index list { } is returned.

4. According to the repairing block index list, data of recovered blocks is read, that is, data segments on the storage nodes corresponding to the indices of recovered blocks, to be used as the input of recovery.

5. Failed blocks are recovered according to the recoverable state, the indices of recovering blocks and the data of their corresponding blocks.

5.1 Single-Failed-Block Local Recovery

Figure 2:
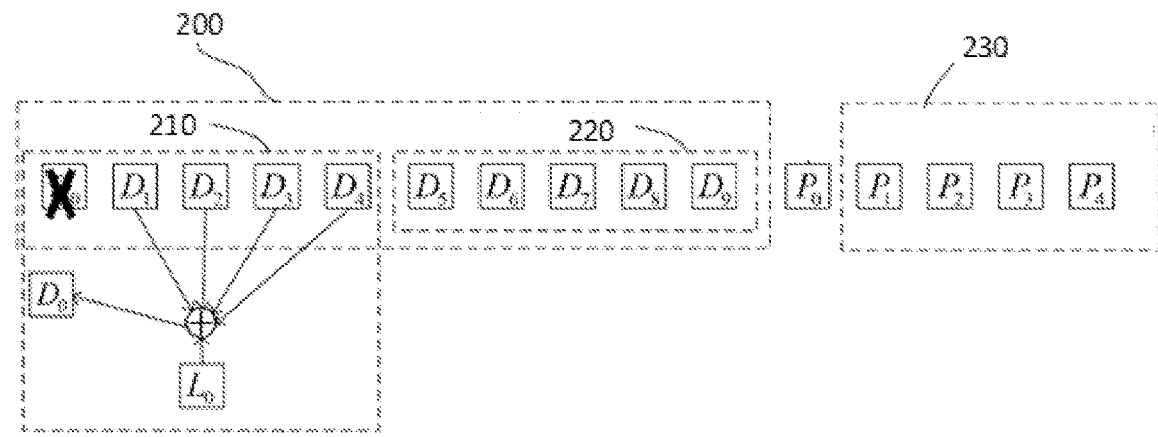
FIG. 2 is a schematic diagram of single failed node recovery.

This process is employed when the recoverable state is related to single-failed-block local recovery, the data segments corresponding to the repairing block index list is performed with XOR operation, and the failed blocks are repaired. As shown in FIG. 2, $D_0$ is repaired by XORing $\{D_1, D_2, D_3, D_4, L_0\}$ of the first local coding packet 210.

5.2 Multi-Failed-Block Local Recovery

Figure 3:
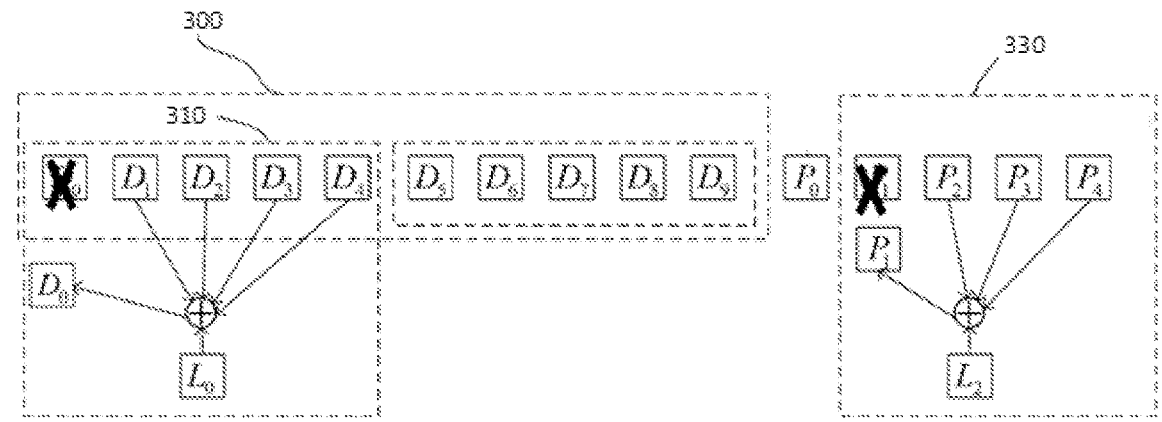
FIG. 3 is a schematic diagram of local recovery for multiple failed nodes.

For each failed block, the local coding packet is computed according to its failed block index, and the failed block is repaired by XORing other data segments (except failed blocks) of the local coding packet. As shown in FIG. 3, $D_0$ is recovered by XORing $\{D_1, D_2, D_3, D_4, L_0\}$ of the first local coding packet 310, and $P_1$ is recovered by XORing $\{P_2, P_3, P_4, L_2\}$ of the third local coding packet 330.

5.3 RS Decoding Recovery

Figure 4:
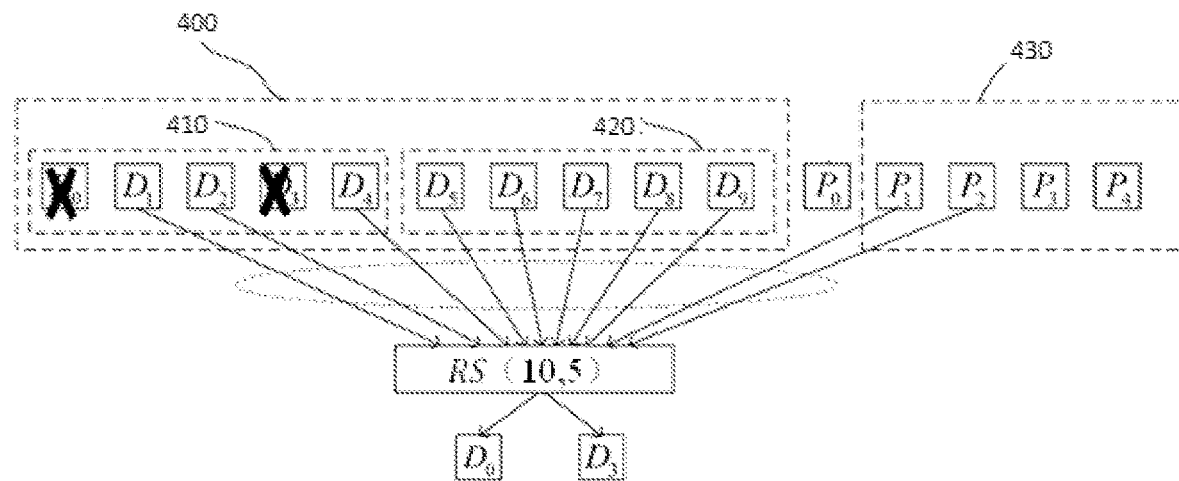
FIG. 4 is a schematic diagram of only-RS decoding recovery for multiple failed nodes.

The first k blocks are taken out from the first k data blocks and m global coding blocks, and the data blocks of the first k data blocks are recovered by calling RS decoding. Through using the first k data blocks, the failed global coding block is recovered (i.e. recoded to generate) by calling RS decoding. Based on the first k data blocks and m global coding blocks, the failed local coding blocks are recovered (i.e. performed with XOR operation to generate) by calling local encoding. AS shown in FIG. 4, $\{D_1, D_2, D_4, D_5, D_6, D_7, D_8, D_9, P_1, P_2\}$ is performed RS decoding to recover failed blocks $\{D_0, D_3\}$.

5.4 Local and RS Decoding Jointly Recovery

Every local coding packet is traversed: when there is only one failed block, it can be recovered by XOR operation; when current $\lceil k/r \rceil$ local coding blocks can be recovered, the implicit global coding block is dynamically repaired; at this point, at least k data segments in the first k data blocks, in global coding blocks and the global coding block are valid, RS decoding is called to recover all failed blocks of the first k data blocks; through using the first k data blocks, the failed global coding block is recovered (i.e. recoded to generate) by calling RS decoding; and based on the first k data blocks and m global coding blocks, the failed local coding blocks are recovered (i.e. performed with XOR operation to generate) by calling local encoding. An example of local and RS decoding jointly recovery is shown in FIG. 5, including: recovering $D_0$ by XORing local coding packets $\{D_1, D_2, D_3, D_4, L_0\}$ and recovering failed blocks $\{D_5, D_7, D_8, D_9\}$ by performing RS decoding on $\{D_0, D_1, D_2, D_3, D_4\} \cup \{D_6, P_1, P_2, P_3, P_4\}$.

In the above embodiments, failure recovery is optimized in the process of encoding, that is, when a plurality of blocks fail, local coding packet recovery is preferred, and RS decoding recovery is still used if it cannot be recovered, and local and RS coding joint recovery is finally adopted, maximizing the reduction of repair bandwidth (the amount of data transmitted by network during recovery).

Those skilled in the art can understand that all or part of the steps of the various methods in the above-mentioned embodiments can be completed by instructing relevant hardware through a program. When all or parts of the functions in the above embodiments are implemented by a computer program, the program may be stored in a computer-readable storage medium, which includes a program that can be executed by the processor. The storage medium may include: a read-only memory, a random access memory, a magnetic disk, an optical disk, a hard disk, etc., and the program is executed by a computer to realize the above functions. For example, by storing the program in the memory of the computer and executing the program in the memory by the processor, all or part of the above functions can be realized. In addition, when all or part of the functions in the above embodiments are implemented by a computer program, the program may also be stored in a storage medium such as a server, another computer, a magnetic disk, an optical disk, a flash disk, or a mobile hard disk, and saved on local device by downloading or copying; or it may update the version of the system of the local device, and when the program in the memory is executed by the processor, all or part of the functions in the foregoing embodiments can be implemented.

The principle and implementation manners present disclosure has been described above with reference to specific embodiments, which are merely provided for the purpose of understanding the present disclosure and are not intended to limit the present disclosure. It will be possible for those skilled in the art to make variations based on the principle of the present disclosure.

The invention claimed is:

1. A method of reading data stored in a distributed storage system having a plurality of storage nodes each configured to store data, wherein the data has been written to the distributed storage system by adopting a method of writing data to the distributed storage system, the method of writing data comprising:
an initializing step configured for setting coding parameters, including: collecting number k of original data blocks, number m of global coding blocks, repair degree r, spacial setting w of algebraic operation field GF, i.e. operation field $GF_{2^w}$, and
an encoding step configured for: dividing every file segment into k data blocks, calling RS(k, m+1) coding to k original data blocks, generating m global coding blocks; for k data blocks, performing XOR operations on r data blocks which are taken out in sequence from k data blocks to totally generate $\lceil k/r \rceil$ local coding blocks; and for m global coding blocks, performing XOR operations on r coding blocks which are taken out in sequence from m global coding blocks to totally generate $\lceil m/r \rceil$ local coding blocks, the method of reading the data comprises:
collecting states of storage nodes, reading states of n storage nodes stored in every data block and coding block which have been encoded, and acquiring an online-block index list and a failed-block index list;
acquiring a decodable state based on the states of storage nodes;
determining position of data to be read during decoding according to different decodable states to define a decoding index list;
reading data blocks or coding blocks needed by decoding according to the decoding index list; and
decoding file segments based on the decodable state, indices of decoded blocks, and their corresponding block data which have already been read.

2. The method according to claim 1, wherein the decodable state comprises a decoding-free state, a locally decodable state, a RS-only decodable state, a local and RS jointly decodable state, and an undecodable state.

3. The method according to claim 1, wherein acquirement of the decodable state is as follows:
the decodable state being a locally decodable one when a single node fails and it is a data node, otherwise the decodable state being a decoding-free one; and
when there is not one failed node, the decodable state being determined orderly by: a decoding-free state being returned when storage nodes storing k data blocks are online; a locally decodable state being returned when there is only one data block failed in each local coding packet and local coding block is online; a RS-only decodable state being returned when no less k blocks from k data blocks and m global coding blocks; when local coding block being able to be recovered by local decoding, an implicit global coding block accordingly being able to be recovered, or when number of recoverable data blocks or global coding blocks decoded locally reaches k, remaining failed data blocks being able to be obtained by RS decoding, and a local and RS jointly decodable state being returned; and an undecodable state being returned when above conditions are not met.

4. The method according to claim 3, wherein
when decoding-free state is returned, k online data blocks are directly adopted to combine into original file segments;
when single-node/multiple-node locally decodable state is returned, for every failed data blocks, r online local blocks are obtained and decoded failed data blocks by XOR operations;
when RS-only decodable state is returned, RS decoding is called by using k input data blocks and/or global coding blocks to obtain all data blocks including failed data blocks; and
when local and RS jointly decodable state is returned, data blocks, first $\lceil k/r \rceil$ local coding blocks, implicit global coding block and other RS global coding blocks are recovered in sequence by using local decoding, and when there are k recoverable or online blocks in current k+m data blocks, global coding blocks and implicit global coding block, all original data blocks are decoded by using RS decoding.

5. The method according to claim 1, wherein total number of encoded data blocks is $n=k+m+\lceil k/r \rceil+\lceil m/r \rceil$, actual remaining data blocks is performed with XOR operations when number of last data blocks is insufficient with r; and actual remaining coding blocks is performed with XOR operations when number of last coding blocks is insufficient with r.

6. The method according to claim 1, wherein RS (k, m+1) coding called by the method is systematic code, that is, first k data blocks remain unchanged, first coding blocks of m+1 RS global coding blocks is an implicit global coding block which is obtained by XOR operations on all data blocks or by XOR operations on first $\lceil k/r \rceil$ local coding blocks.

7. A method of data recovery for a distributed storage system for data recovery of storage node failures in the distributed storage system, the distributed storage system having a plurality of storage nodes each configured to store data, wherein the data has been written to the distributed storage system by adopting a method of writing data to the distributed storage system, the method of writing data comprising:
an initializing step configured for setting coding parameters, including: collecting number k of original data blocks, number m of global coding blocks, repair degree r, spacial setting w of algebraic operation field GF, i.e. operation field $GF_{2^w}$, and
an encoding step configured for: dividing every file segment into k data blocks, calling RS(k, m+1) coding to k original data blocks, generating m global coding blocks; for k data blocks, performing XOR operations on r data blocks which are taken out in sequence from k data blocks to totally generate $\lceil k/r \rceil$ local coding blocks; and for m global coding blocks, performing XOR operations on r coding blocks which are taken out in sequence from m global coding blocks to totally generate $\lceil m/r \rceil$ local coding blocks, the method of data recovery comprises:
collecting states of storage nodes, reading states of n storage nodes stored in every data block and coding block which have been encoded, and acquiring an online-block index list and a failed-block index list;
acquiring a recoverable state based on the states of storage nodes;

obtaining a repairing block index list that should be read and is used for recovering failed blocks according to the recoverable state;

reading data blocks or coding blocks of storage nodes corresponding to indices of repaired blocks according to the repairing block index list; and recovering failed blocks based on the recoverable state, indices of repairing blocks, and their data of corresponding blocks.

8. The method according to claim 7, wherein the recoverable state comprises a recovery-free state, a local recovery state, a RS decodable recovery state, a local and RS jointly decodable recovery state, and an unrecoverable state.

9. The method according to claim 7, wherein acquirement of the recoverable state is determined orderly by:

returning recovery-free state when failed-block index list is empty;

returning single-failed-block local recoverable state when only one index is contained in failed-block index list, and returning multi-failed-block local recoverable state when every failed block locates in different local coding packets;

returning RS decodable recovery state when current k+m data segments has at least k online ones, where the data segment consist of k data blocks and m global coding blocks; and recovering failed data blocks by using local decoding when above conditions are not met, and returning local and RS jointly decodable recovery state when at least k data segments from first k+m data segments are valid; otherwise, recovering local coding blocks, dynamically recovering implicit global coding block when all local coding blocks are recoverable, and returning local and RS jointly decodable recovery state when at least k data segments from first k+m data segments and implicit global coding block are valid; and finally recovering failed global coding blocks by using local decoding, returning local and RS jointly decodable recovery state when at least k data segments from first k+m data segments and implicit global coding block are valid.

10. The method according to claim 9, wherein when all nodes are online, no recovery is needed;

when the recoverable state is single-failed-block local recoverable one, the data segments corresponding to repairing block index list is performed by XOR operations to recover failed blocks; and when the recoverable state is multi-failed-block local recoverable one, for each failed block, local coding packet is computed based on its failed block index, other data segments except failed blocks in local coding packet are performed by XOR operations to recover failed blocks;

when the recoverable state is RS decodable recovery one, first k blocks are taken out from first k data blocks and m global coding blocks, failed data blocks of first k data blocks are recovered by calling RS decoding, failed global coding block are recovered by calling RS decoding based on first k data blocks, and failed local coding blocks are recovered by calling local decoding based on first k data blocks and m global coding blocks; and when the recoverable state is local and RS jointly decodable recovery state, every local coding packet is traversed, and when there is only one failed block, failed block is recovered by an XOR operation, implicit global coding block is recovered when first $\lceil k/r \rceil$ local coding blocks are recoverable, and when current k+m data segments and implicit global coding block has k recoverable or online ones, RS decoding is called to recover all failed blocks of first k data blocks, failed global coding blocks are recovered by calling RS decoding based on first k data blocks, and failed local coding blocks are recovered by calling RS decoding based on first k data blocks and m global coding blocks.

11. The method according to claim 7, wherein total number of encoded data blocks is $n=k+m+\lceil k/r \rceil+\lceil m/r \rceil$, actual remaining data blocks is performed with XOR operations when number of last data blocks is insufficient with r; and actual remaining coding blocks is performed with XOR operations when number of last coding blocks is insufficient with r.

12. The method according to claim 7, wherein RS (k, m+1) coding called by the method is systematic code, that is, first k data blocks remain unchanged, first coding blocks of m+1 RS global coding blocks is an implicit global coding block which is obtained by XOR operations on all data blocks or by XOR operations on first $\lceil k/r \rceil$ local coding blocks.

* * * * *